United States Patent
Zhang

(10) Patent No.: US 9,152,756 B2
(45) Date of Patent: Oct. 6, 2015

(54) GROUP BASED ROUTING IN PROGRAMMABLE LOGIC DEVICE

(71) Applicant: Lattice Semiconductor Corporation, Hillsboro, OR (US)

(72) Inventor: Qinhai Zhang, San Jose, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/137,443

(22) Filed: Dec. 20, 2013

(65) Prior Publication Data

US 2015/0178437 A1    Jun. 25, 2015

(51) Int. Cl.
  *G06F 9/455*   (2006.01)
  *G06F 17/50*   (2006.01)

(52) U.S. Cl.
  CPC ........ *G06F 17/5081* (2013.01); *G06F 17/5077* (2013.01)

(58) Field of Classification Search
  USPC .......................... 716/113, 116, 118, 119, 126
  See application file for complete search history.

(56) References Cited

U.S. PATENT DOCUMENTS

| | | | |
|---|---|---|---|
| 8,069,431 B1 | 11/2011 | Zhang | |
| 8,136,077 B2 | 3/2012 | McMurchie et al. | |
| 8,141,018 B1 | 3/2012 | Guzy | |
| 8,181,139 B1 * | 5/2012 | Chen et al. | 716/121 |
| 8,549,458 B2 * | 10/2013 | Sezginer | 716/126 |
| 8,627,255 B2 * | 1/2014 | Vedantam et al. | 716/126 |
| 2014/0075402 A1 * | 3/2014 | Chen et al. | 716/112 |

OTHER PUBLICATIONS

Wikipedia, "Static timing analysis", Retrieved from the Internet: <http://en.wikipedia.org/wiki/Static_timing_analysis>, Nov. 20, 2013, 4 pages.
Behera et al., "Equations and Impacts of Setup and Hold Time", Retrieved from the Internet: <http://www.edn.com/Home/PrintView?contentItemId=4392195>, Freescale Semiconductor, Aug. 10, 2012, 5 pages.
Betz et al., "VPR: A New Packing, Placement and Routing Tool for FPGA Research", 1997 International Workshop on Field Programmable Logic and Applications, 1997, pp. 1-10.
Brown et al., "A Detailed Router for Field-Programmable Gate Arrays", Dept. of Electrical Engineering, University of Toronto, Ontario, Canada, 1990, pp. 382-385.
Lee, C.Y., "An Algorithm for Path Connections and its applications", IRE Trans. Electron Computer, vol. EC-10, Sep. 1961, pp. 346-365.
Luu et al., "VPR: 5.0: FPGA CAD and Architecture Exploration Tools with Single-Driver Routing, Heterogeneity and Process Scaling", FPGA symposium, Feb. 2008, pp. 133-142.

(Continued)

*Primary Examiner* — Brian Ngo

(57) ABSTRACT

Various techniques are provided to route connections within a programmable logic device (PLD). In one example, a method includes determining timing slacks for connections described in a netlist for a programmable logic device (PLD). The method also includes determining a plurality of priority groups. The connections are associated with one or more of the priority groups based on the timing slacks. The method also includes routing the connections associated with each priority group, from a highest priority group to a lowest priority group. Each priority group is iteratively routed to remove routing conflicts before lower priority groups are routed. Additional methods, systems, machine-readable mediums, and other techniques are also provided.

16 Claims, 5 Drawing Sheets

(56) References Cited

OTHER PUBLICATIONS

McMurchie et al., "PathFinder: A Negotiation-Based Performance-Driven Router for FPGAs", in Proceedings of $3^{rd}$ International ACM/SIGDA, Symposium on Field Programmable Gate Arrays, Feb. 1995, pp. 111-117.

Soukup, J., "Fast Maze Router", Proc. of $15^{th}$ DAC, 1978, pp. 100-102.

Sait et al., "Grid Routing", King Fand University of Petroleum & Minerals, College of Computer Sciences & Engineering, Department of Computer Engineering, Dec. 1995, 41 pages.

Hadlock, F. O., "A Shortest Path Algorithm for Grid Graphs", Networks, 1977, vol. 7, Issue 4, pp. 323-334.

* cited by examiner

US 9,152,756 B2

GROUP BASED ROUTING IN PROGRAMMABLE LOGIC DEVICE

TECHNICAL FIELD

The present invention relates generally to programmable logic devices and, more particularly, to the routing of signals to components in such devices.

BACKGROUND

Programmable logic devices (PLDs) (e.g., field programmable gate arrays (FPGAs), complex programmable logic devices (CPLDs), field programmable systems on chips (FPSCs), or other types of programmable devices) may be configured to provide user-defined features. PLDs typically include various components, such as programmable logic blocks (PLBs), memory blocks, digital signal processing blocks, input/output blocks, and other components. PLD components may be interconnected by programmable routing resources (e.g., signal paths) of the PLD to implement a desired circuit design. PLDs typically have a limited supply of routing resources available to provide connections between components of the PLD. This differs from conventional application-specific integrated circuits (ASICs) in which typically any desired signal path may be custom-manufactured for a particular application.

Unfortunately, existing approaches to PLD connection routing often fail to provide such routings efficiently. In one approach, maze routing techniques may be used to route connections one at a time. However, maze routing techniques may fail to route all desired connections or may fail to meet the timing requirements of a particular design. In such cases, ripup and reroute operations are subsequently performed to remove routed connections and attempt to reroute them through alternative routing resources of the PLD. Such operations are inefficient, often result in degraded PLD performance, and significantly increase the time and processing resources needed to determine connection routings for the PLD.

In another approach, negotiation routing techniques may be used to route multiple connections using shared routing resources. Resource conflicts among commonly-routed connections are then resolved based on priorities associated with the connections. For example, negotiation routing techniques may be "connection-based" (e.g., where connections of different signals are routed one at a time), or "signal-based" (e.g., where signals are routed one at a time, with each signal having one or more associated connections that are routed before additional signals are routed). Unfortunately, negotiation routing techniques typically suffer the same drawbacks as conventional maze routing techniques, thus requiring similar remedial ripup and reroute operations.

Accordingly, there is a need for an improved approach to the routing of connections in PLDs.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
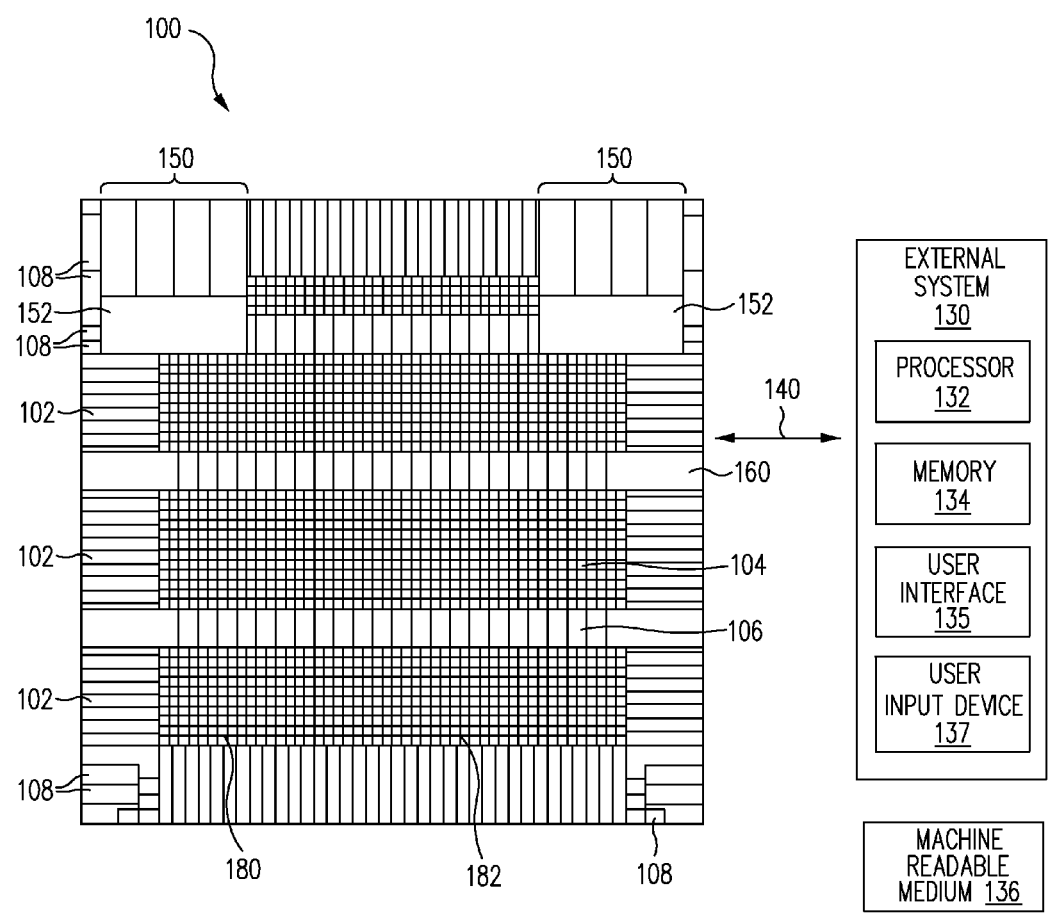
FIG. 1 illustrates a block diagram of a programmable logic device (PLD) in accordance with an embodiment of the disclosure.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments.

In accordance with various embodiments set forth herein, techniques are provided to route connections among components of a programmable logic device (PLD). For example, in some embodiments, a PLD includes a plurality of programmable logic blocks (PLBs), memory blocks, digital signal processing blocks, input/output blocks, and/or other components that may be interconnected in a variety of ways to implement a desired circuit design. A desired circuit design may be represented, at least in part, by a netlist, which can describe components and connections therebetween in the desired circuit design. The netlist may be used to place components and/or route connections (e.g., using routing resources of the PLD) for the desired circuit design with respect to a particular PLD (e.g., using a simulation of the desired circuit design constructed from the netlist).

Typically, a desired circuit design includes various timing requirements associated with its operation. For example, a particular circuit design may be required to process digital data I/O according to a throughput requirement, which in turn may necessitate particular clock frequencies applied to one or more components of the circuit design. The clock frequencies, coupled with individual I/O requirements and characteristics of the components themselves, can dictate various timing requirements (e.g., required setup/hold times at inputs/outputs and data paths, maximum delay for user-specified signals, maximum skew for clock and bus-like signals, and/or other timing requirements) for each connection between components in the circuit design. These timing requirements may be represented by a single value for each connection, which may be referred to as that connection's "timing slack."

Each connection may be identified, at least in part, by its associated starting point (e.g., source node), ending point (e.g., load node), and timing slack. In some embodiments, timing slack generally corresponds to the connection's available signal propagation time from its source node to its corresponding load node (e.g., the time for a signal to travel from an output node/starting point to an input node/ending point). More specifically, in some embodiments, the timing slack associated with each connection may be the difference between a required time (e.g., the greatest permissible elapsed time for a signal to propagate from a source node to a load node without making the clock cycle longer than desired) and an arrival time (e.g., the actual elapsed time for the signal to propagate from the source node to the load node). In some embodiments, an unrouted connection may have a timing slack derived solely from the various timing requirements described in or derived from a netlist. By contrast, in some embodiments, a routed connection may have a timing slack derived from the various timing requirements, the estimated or actual length of the routed connection, and/or other characteristics of the routing resources allocated to the routed connection. Accordingly, the timing slack associated with a particular connection may change during the routing process (e.g., as a result of routing resource allocations).

In one example, an unrouted connection may be initially associated with a timing slack of 200 ns based on the timing requirements of a particular circuit design, PLD, and/or clock frequency. If the connection is then routed using routing resources that correspond to a propagation time of 100 ns between the source and load nodes, the routed connection's updated timing slack would be 100 ns (e.g., 200 ns required time−100 ns arrival time=100 ns timing slack). As used herein, a negative timing slack indicates a connection that is violating at least one of its timing requirements, and this would typically indicate that alternative routing resources (e.g., shorter length) or alternative clock frequencies (e.g., lower frequencies) are required to implement the circuit design with a reduced risk of timing related errors.

In various embodiments, the connections to be routed in the PLD may be associated with one or more priority groups that are dynamically determined from the current timing slacks of the connections. The priority groups may be initially determined, and then dynamically adjusted as connections are routed and their corresponding timing slacks are updated to reflect the as-routed timing requirements of the connections. Accordingly, connections initially associated with a first priority group (e.g., based on initial timing slacks) may be subsequently associated with a second priority group (e.g., based on updated timing slacks) as more connections are routed in the PLD.

In some embodiments, the priority groups may be based on a corresponding plurality of percentages applied to, for example, a min/max range of the timing slacks, a total number of the connections, and/or other priority criteria associated with the connections and/or their corresponding timing slacks. For example, in some embodiments, a user may set percentages for the priority groups as 2%, 10%, 40%, and 100%, and the percentages may be used to determine corresponding timing slack thresholds. In one embodiment, where the percentages are applied to a min/max range of timing slacks for connections of a particular circuit design, the highest priority group would correspond to connections with timing slacks in the smallest 2% of the range of timing slacks (e.g., connections with the most stringent timing requirements and/or that are violating time requirements as-routed). The second, third, and fourth highest priority groups would correspond to connections with timing slacks in the smallest 10%, smallest 40%, and 100% of the range of timing slacks, respectively. Although four priority groups are discussed with particular percentages, any desired number of priority groups and associated percentages (or other criteria used to determine thresholds of the priority groups) may be used in various embodiments.

Routing begins with the connections in the highest priority group and continues until no unrouted and/or no conflicted connections remain in the highest priority group (e.g., to remove routing conflicts including unrouted and/or conflicted connections), or until a maximum time or iteration count is reached. Then, routing begins for connections corresponding to the second highest priority group (e.g., connections with timing slacks in the smallest 10% of the range of timing slacks), and subsequently continues for the third and fourth highest priority groups. Once all connections are routed, the corresponding connection routing may be stored and/or implemented in routing resources of a PLD.

Notably, lower priority groups may include higher priority groups (e.g., in the example above, the 10% timing slack priority group may be a superset that includes the 2% timing slack priority group), so that routing is eventually distributed across the entire set of connections for the circuit design. Because high priority connections are routed first as a group, there is less risk of rerouting and/or ripup, as compared to conventional approaches. Furthermore, in some embodiments, the individual connections are not themselves ranked before routing (which would require substantial additional processing time and memory allocation, particularly when the priority groups are adjusted according to updated timing slacks), processing resources are conserved. Routing within each priority group occurs iteratively, as described further herein.

In some embodiments, the dynamic organizational structure provided by the priority groups decreases the processing time needed to route connections for a particular circuit design while increasing the number of routed connections that conform to their corresponding timing requirements (e.g., thereby providing higher PLD performance for a particular desired circuit design), as compared to conventional routing approaches. Furthermore, in some embodiments, the plurality of priority groups may be determined and used to route connections while reducing (or without substantially increasing) the memory used to route the connections.

Referring now to the drawings, FIG. 1 illustrates a block diagram of a PLD 100 in accordance with an embodiment of the disclosure. PLD 100 (e.g., a field programmable gate array (FPGA), a complex programmable logic device (CPLD), a field programmable system on a chip (FPSC), or other type of programmable device) generally includes input/output (I/O) blocks 102 and logic blocks 104 (e.g., also referred to as programmable logic blocks (PLBs), programmable functional units (PFUs), or programmable logic cells (PLCs)).

I/O blocks 102 provide I/O functionality (e.g., to support one or more I/O and/or memory interface standards) for PLD 100, while programmable logic blocks 104 provide logic functionality (e.g., LUT-based logic or logic gate array-based logic) for PLD 100. Additional I/O functionality may be provided by serializer/deserializer (SERDES) blocks 150 and physical coding sublayer (PCS) blocks 152. PLD 100 also includes hard intellectual property core (IP) blocks 160 to provide additional functionality (e.g., substantially predetermined functionality provided in hardware which may be configured with less programming than logic blocks 104).

PLD 100 may also include blocks of memory 108 (e.g., blocks of EEPROM, block SRAM, and/or flash memory), clock-related circuitry 108 (e.g., PLL and/or DLL circuits), and/or various routing resources (e.g., routing resources 180 and nodes 182) as appropriate. In general, the various elements of PLD 100 may be used to perform their intended functions for desired applications, as would be understood by one skilled in the art.

For example, I/O blocks 102 may be used for programming PLD 100, such as logic blocks 104 and memory 106, or transferring information (e.g., various types of data and/or control signals) to/from PLD 100 through various external ports as would be understood by one skilled in the art. I/O blocks 102 may provide a first programming port (which may represent a central processing unit (CPU) port, a peripheral data port, an SPI interface, and/or a sysCONFIG programming port) and/or a second programming port such as a joint test action group (JTAG) port (e.g., by employing standards such as Institute of Electrical and Electronics Engineers (IEEE) 1149.1 or 1532 standards). I/O blocks 102 typically, for example, may be included to receive configuration data and commands (e.g., over one or more connections 140) to configure PLD 100 for its intended use and to support serial or parallel device configuration and information transfer with SERDES blocks 150, PCS blocks 152, hard IP blocks 160, and/or logic blocks 104 as appropriate.

In another example, routing resources 180 may be used to route connections between components, such as between I/O nodes of logic blocks 104. In some embodiments, routing resources 180 may include programmable elements, such as nodes 182, which may be used to selectively form a signal path for a particular connection between components of PLD 100.

It should be understood that the number and placement of the various elements are not limiting and may depend upon the desired application. For example, various elements may not be required for a desired application or design specification (e.g., for the type of programmable device selected).

Furthermore, it should be understood that the elements are illustrated in block form for clarity and that various elements would typically be distributed throughout PLD 100, such as in and between logic blocks 104 and hard IP blocks 160, to perform their conventional functions (e.g., storing configuration data that configures PLD 100 or providing interconnect structure within PLD 100). It should also be understood that the various embodiments disclosed herein are not limited to programmable logic devices, such as PLD 100, and may be applied to various other types of programmable devices, as would be understood by one skilled in the art.

An external system 130 may be used to create a desired user configuration of PLD 100 and generate corresponding configuration data to program (e.g., configure) PLD 100. For example, external system 130 may provide such configuration data in the form of a bitstream to one or more I/O blocks 102 and/or other portions of PLD 100. As a result, programmable logic blocks 104, routing resources 180 including nodes 182, and various other hardware of PLD 100 may be configured to operate in accordance with a desired circuit design, a netlist, a component placement, a connection routing, and/or other user-specified applications.

In the illustrated embodiment, external system 130 is implemented as a computer system, which may be used to perform various computer-implemented methods. In this regard, external system 130 includes, for example, one or more processors 132 which may be configured to execute instructions, such as software instructions, provided in one or more memories 134 and/or stored in non-transitory form in one or more non-transitory machine readable mediums 136 (e.g., which may be internal or external to system 130). For example, in some embodiments, external system 130 may run PLD configuration software, such as Lattice Diamond System Planner software available from Lattice Semiconductor Corporation of Hillsboro, Oreg., to permit a user to create a desired configuration and generate corresponding configuration data to program PLD 100. For example, in some embodiments, processor 134 may be configured with such software and be used to perform various operations further described herein.

External system 130 also includes, for example, a user interface 135 (e.g., a screen or display) to display information to a user (e.g., information stored in memory 134), and one or more user input devices 137 (e.g., a keyboard, mouse, trackball, touchscreen, and/or other device) to receive user commands to prepare a desired configuration of PLD 100. In some embodiments, user interface 135 may be adapted to display a netlist, a component placement, a connection routing, hardware description language (HDL) code, and/or other final and/or intermediary representations of a desired circuit design, for example.

Figure 2:
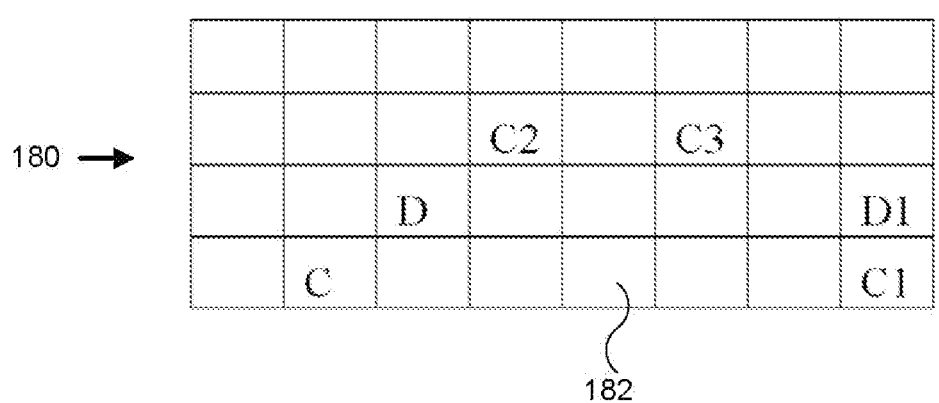
FIG. 2 illustrates a diagram of unrouted connections in routing resources of a PLD that may be routed in accordance with an embodiment of the disclosure.

FIG. 2 illustrates a diagram of unrouted connections in routing resources 180 of PLD 100 that may be routed in accordance with an embodiment of the disclosure. As shown, routing resources 180 include a number of nodes 182 that may be configured to route four connections between the following nodes shown in FIG. 2: C-C1, C-C2, C-C3, and D-D1, where the three "C" connections are associated with the same signal (e.g., they are electrically coupled to each other). In the embodiment illustrated by FIG. 2, nodes C and D are source nodes corresponding to output nodes of already-placed components in a circuit design, and nodes C1, C2, C3, and D1 are load nodes corresponding to input nodes of already-placed components in the same circuit design. Although each of the connections is initially unrouted, in some embodiments, a timing slack for each connection may include an estimated signal propagation time based on the relative positions of the already-placed source and load nodes, without regard for specific and or conflicting routes, for example. Using methods described herein, the four connections may be routed more efficiently than with conventional routing approaches.

Figure 3:
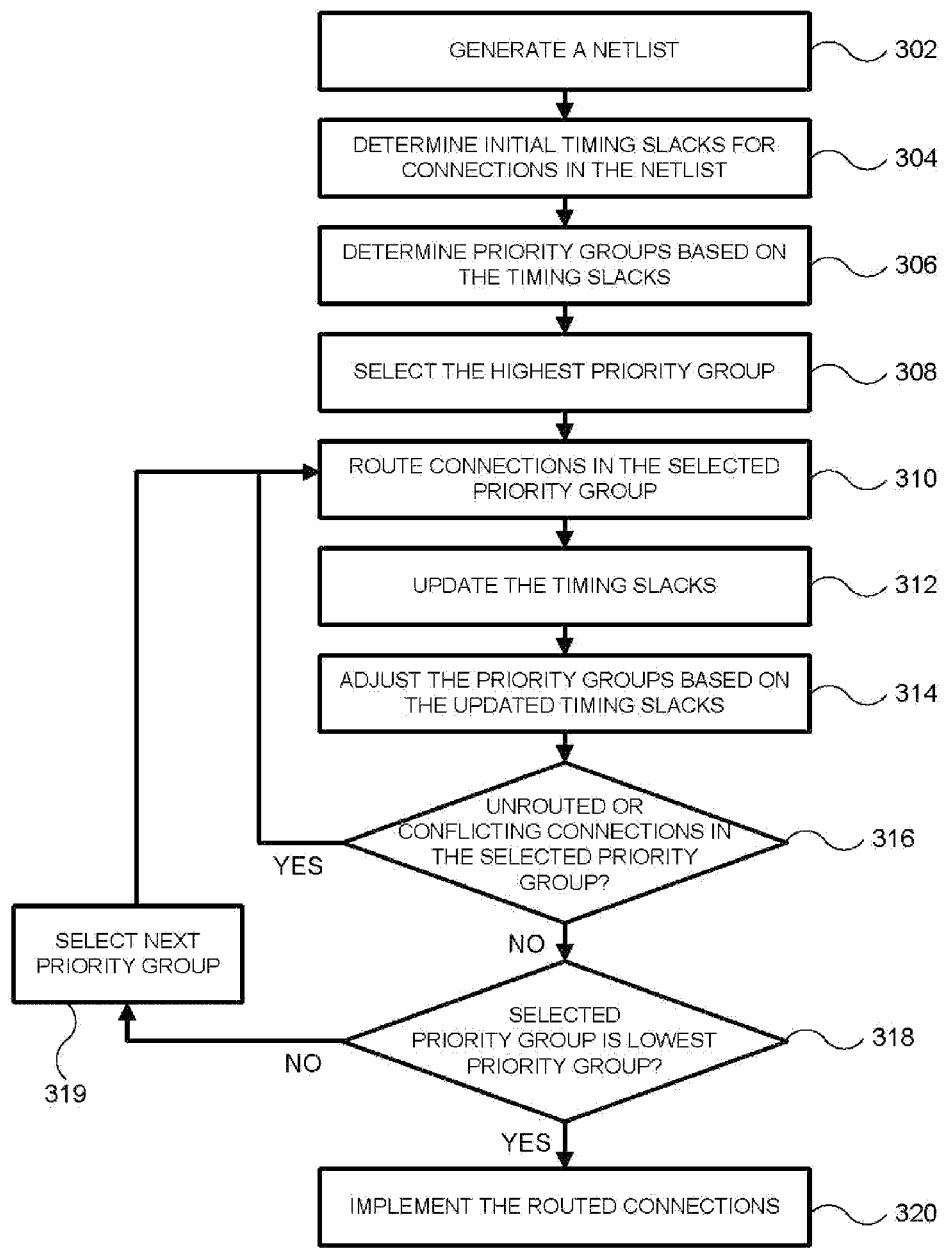
FIG. 3 illustrates a process to route connections in routing resources of a PLD in accordance with an embodiment of the disclosure.

FIG. 3 illustrates a process to route connections in routing resources of a PLD in accordance with an embodiment of the disclosure. For example, the process of FIG. 3 may be performed by a user interacting with external system 130 running Lattice Diamond software to configure PLD 100.

In operation 302, external system 130 generates a netlist for implementing a desired circuit design using PLD 100. For example, the netlist may identify one or more connections to be routed between components in a corresponding circuit design. In some embodiments, a netlist may identify source and load node locations of connections, such as those shown in FIG. 2, or system 130 may be configured to determine source and load node locations of connections, component placement, and other configuration information for a desired configuration of PLD 100.

In operation 304, external system 130 determines initial timing slacks for connections in a netlist, such as the netlist generated in operation 302. For example, a netlist may include a listing of components and the connections between components. For each connection (e.g., each source/load node pair), system 130 may be configured to determine a timing slack based on timing requirements corresponding to clock frequency, device performance, corresponding component I/O timing requirements, and/or other information within the netlist. In embodiments where the netlist includes component placement positions, system 130 may be configured to include signal propagation times estimated from the component placement positions and corresponding source/load node positions. For example, in FIG. 2, propagation times for each of the illustrated connections may be estimated by counting horizontal blocks between source/load node pairs, which can be performed with minimal processing resources. In other embodiments, system 130 may be configured to first place components in the netlist, determine source/load node positions from the component placement, and then determine corresponding timing slacks.

In operation 306, external system 130 determines priority groups based on timing slacks, such as the timing slacks determined in operation 304. In this regard, each of the connections identified in the netlist may be initially associated with one or more priority groups based on the timing slacks. For example, system 130 may be configured to apply a set of percentages (e.g., supplied by a user) to parameters associated with the set of timing slacks for connections in a netlist, and the percentages and parameters may be used to determine timing slack thresholds for the various priority groups that can be ranked from highest priority to lowest priority (e.g., corresponding to smallest timing slack to largest timing slack, by group).

In one embodiment, system 130 may be configured to apply a set of percentages to a min/max range of timing slacks to determine a corresponding set of timing slack thresholds and provide priority groups. This embodiment may be implemented with minimal processing resources, as it uses only a determination of a maximum and minimum timing slack. In another embodiment, system 130 may be configured to apply a set of percentages to a total number of connections described in a netlist, for example, and derive a corresponding set of timing slack thresholds from connections ranked by timing slack. Although this embodiment may use some processing resources to pre-rank unrouted connections, each priority group may thereafter include a known number of connections, which can provide further processing benefits related to memory allocation, for example, as the routing process proceeds to completion.

As discussed, in various embodiments, each "lower" priority group includes all the connections in the "higher" priority groups, and includes additional "lower" priority connections, all as determined by the associated timing slack thresholds. Thus, the lowest priority group (e.g., the 100% group) includes all connections described in the netlist, and routing is at least attempted on all connections by the completion of the process.

As an example, referring back to FIG. 2, connections C-C1 and D-D1 may have small initial timing slacks, connection C-C2 may have an intermediate timing slack, and connection C-C3 may have a large timing slack. Percentages applied to parameters associated with the set of timing slacks may provide timing slack thresholds such that: connections C-C1 and D-D1 are in a highest priority group (e.g., corresponding to the most stringent timing slack requirements); connections C-C1, D-D1, and C-C2 are in a medium priority group (e.g., the medium priority group is a superset that also includes the connections of the highest priority group); and connections C-C1, D-D1, C-C2, and C-C3 are in a lowest priority group (e.g., the lowest priority group is a larger superset that also includes the connections of the highest and medium priority groups).

In operation 308, external system 130 selects the highest priority group from, for example, the priority groups determined in operation 306. Thus, system 130 proceeds to operation 310 and begins routing a group of connections with the smallest timing slacks first (e.g., the connections with the most stringent timing requirements) in order to reduce a risk of reroute and ripup as the routing process proceeds through all the connections.

In operation 310, external system 130 routes connections in the selected priority group, such as the highest priority group selected in operation 304, for example, or the priority group selected in operation 319 (further described herein). For example, system 130 may use a maze routing approach, a connection-based negotiation approach, a signal-based negotiation approach, and/or other routing approaches to iteratively route connections in a selected priority group. In contrast to conventional maze and negotiation routing, the dynamically determined priority groups of process 300, as described herein, direct the routing of operation 310 such that less compute time is needed to finalize a routing, and more connections in the finalized routing conform to the timing requirements of the design.

In embodiments where a negotiation-based approach is used in operation 310, a single iteration of operation 310 will typically route all connections in the selected priority group, but some of the routed connections will be conflicting connections, where routing resources are shared between two or more connections. A first iteration of operation 310 may not resolve all conflicts, and so multiple iterations (e.g., enabled by operation 316 further described herein) may be performed. In embodiments where a signal-based negotiation approach is used, and where multiple connections of a signal are within the selected priority group, signals and connections may be selected so that a maze waveform used to route one connection associated with the signal may be reused to route other connections associated with the signal to reduce processing resources.

In operation 312, external system 130 updates timing slacks, such as the timing slacks for connections routed in operation 310. In some embodiments, timing slacks need only be updated if their corresponding connections are routed or rerouted in operation 310. In operation 314, external system 130 optionally adjusts priority groups based on updated timing slacks, such as the timing slacks updated in operation 312. For example, routed connections may have substantially smaller (or even negative) timing slacks relative to their unrouted timing slacks, and so, for example, a min/max range of timing slacks may change after each iteration of operation 310. In embodiments where the priority groups are determined from percentages applied to a min/max range of timing slacks, the connections corresponding to a priority group may change (e.g., some connections may fall outside or within an adjusted priority group, still defined by a percentage for example, but only after the timing slacks are updated) after each iteration of operation 310, once timing slacks for routed connections are updated. The dynamic nature of the priority groups and corresponding connections, as well as the overall organizational structure, provides additional flexibility in the routing process that in turn produces the efficiency and performance benefits, as described herein.

In some embodiments, operations 312 and 314 may be at least partially embedded into operation 310, for example, and timing slacks may be updated and priority groups adjusted after a portion of operation 310 is completed (e.g., after each signal is routed, or after a percentage of the connections in the selected priority group are routed).

In operation 316, external system 130 determines if unrouted or conflicting connections are present in the currently selected priority group. If there are unrouted or conflicting connections in the selected priority group, system 130 iterates back through operation 310 to route and/or reroute connections in the selected priority group. Significantly, because routing of connections is organized by priority groups, only a subset of connections may be required to be revised in repeated iterations of operation 310 for the currently selected priority group. If the selected group is successfully routed, system 310 proceeds to operation 318. In some embodiments, other criteria may be included to determine whether to iterate or proceed, such as whether all or some portion of connections have non-negative and/or minimum-value timing slacks, for example.

In operation 318, external system 130 determines if the currently selected priority group is the lowest priority group. If the selected priority group is not the lowest priority group, system 130 proceeds to operation 319, selects the next priority group (e.g., having a larger timing slack threshold), and then begins to iterate on the newly selected priority group through operations 310-316. If the selected priority group is the lowest priority group (e.g., which includes all connections in the netlist), all connections are routed connections with no conflicting routing resources (as indicated by operation 316), and system 130 proceeds to operation 320.

In operation 320, external system 130 implements routed connections, such as the routed connections determined in the various iterations of operation 310 and/or other operations. For example, system 130 may be configured to store the routed connections and/or corresponding configuration data to memory 134 and/or medium 136, to display the routed connections to a user using user interface 135, and/or to configure PLD 100 according to the routed connections and/or corresponding configuration data, as described herein to program PLD 100 for an intended use/desired circuit design.

Figure 4:
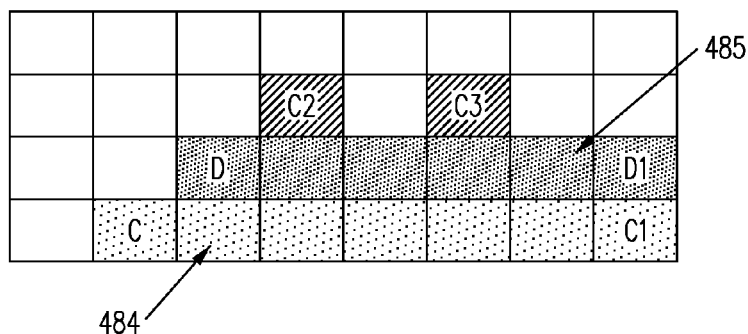
FIGS. 4-6 illustrate diagrams of connections in routing resources of a PLD at various stages of routing in accordance with embodiments of the disclosure.
Figure 5:
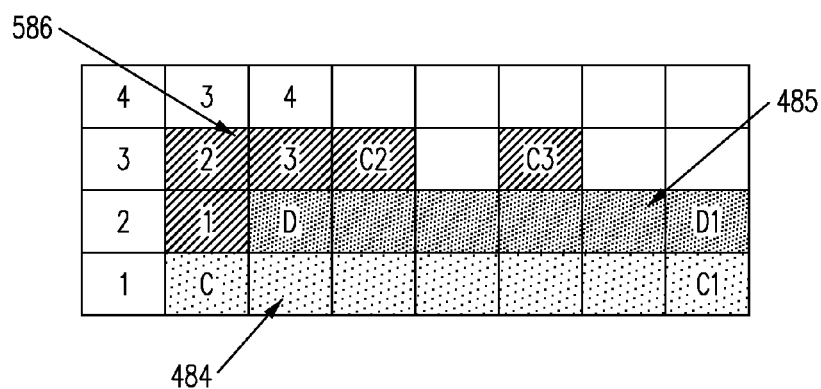
Figure 6:
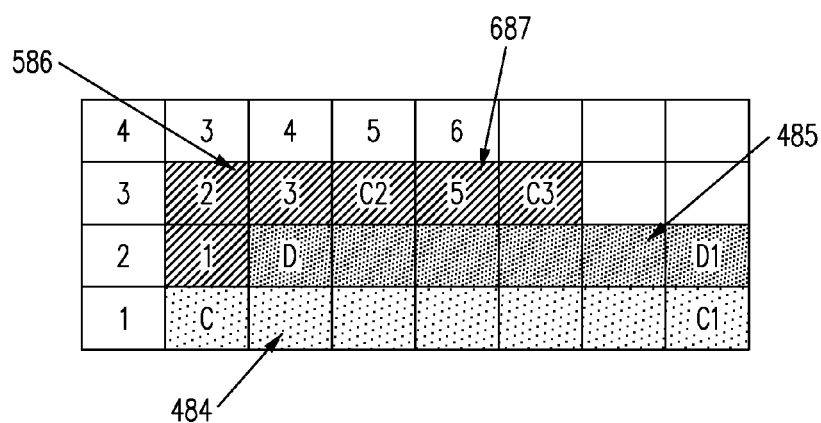

FIGS. 4-6 illustrate diagrams of connections in routing resources of a PLD (e.g., routing resources 180 and nodes 182 of PLD 100) at various stages of routing in accordance with an embodiment of the disclosure. It is noted for clarity that FIGS. 4-6 describe an embodiment with two priority groups, whereas FIG. 2 has been described previously as an embodiment with three priority groups (highest, medium, and lowest). In FIG. 4, connections C-C1 and D-D1 in a highest priority group (e.g., having the smallest timing slacks) have been routed without conflicts according to signal paths 484 and 485, as shown, and routing of unrouted connections C-C2 and C-C3 in a selected lowest priority group (e.g., which includes connections C-C1 and D-D1) is proceeding as described in operation 310.

In FIG. 5, system 130 has routed connection C-C2 using a signal-based negotiation approach to produce signal path 586, and the various numbered nodes indicate a maze waveform calculated to determine the shortest path for connection C-C2 (e.g., each number represents the minimum number of nodes required to reach that node, from source node C). Routing resources/nodes already allocated to signal paths 484 and 485 are not shown because higher priority connections C-C1 and D-D1 were previously routed, and an equivalent shortest path for connection C-C2 is available without conflicting with connections C-C1 or D-D1, which can be determined by various negotiation-based approaches.

In FIG. 6, system 130 has routed connection C-C3 using a signal-based negotiation approach to produce signal path 687, and the additional numbered nodes indicate how a signal-based approach can reuse the maze waveform calculated to determine the shortest path for connection C-C2 to determine the shortest path for connection C-C3. As before, the prior routing of higher priority connections C-C1 and D-D1 has reduced a risk of reroute and ripup that would otherwise be greater with conventional approaches. Further, the prior routing of higher priority connections C-C1 and D-D1 has resulted in an optimum and valid connection routing, which can increase an expected performance when implemented in PLD 100.

Figure 7:
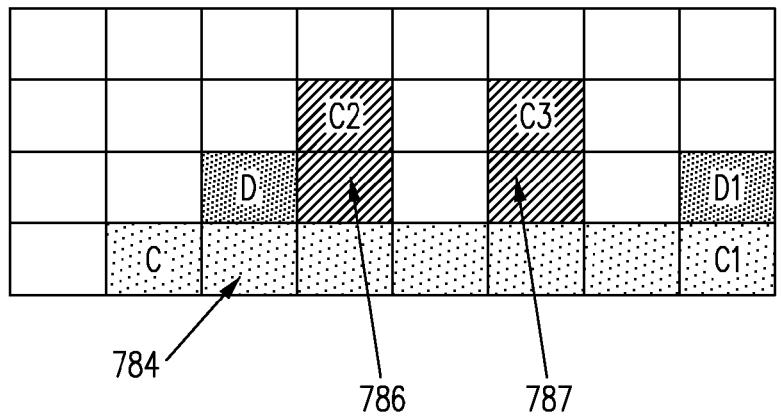
FIGS. 7-8 illustrate diagrams of undesirable connections in routing resources of a PLD at various stages of routing in accordance with conventional routing techniques.
Figure 8:
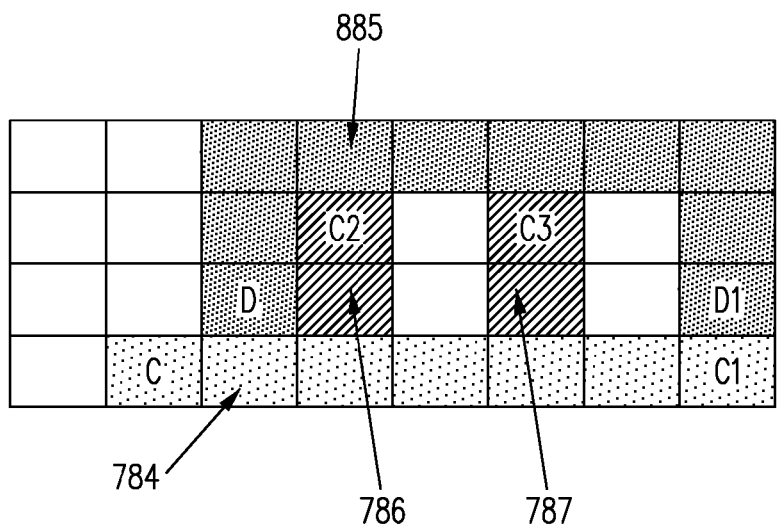

FIGS. 7-8 are provided to illustrate how alternative routing can cause inefficiencies in routing and/or degrade circuit performance. In this regard, FIGS. 7-8 show embodiments with the same connections as described with reference to FIGS. 4-6, but routed using less efficient conventional routing techniques and without using priority groups as described herein. In FIG. 7, connections C-C1, C-C2, and C-C3 have been previously routed according to signal paths 784, 786, and 787, and routing of unrouted connection D-D1 is proceeding according to a conventional signal-based negotiation approach. As previously discussed, connection D-D1 has a smaller timing slack than connections C-C2 and C-C3, but the conventional routing approach illustrated in FIG. 8 results in a longer signal path 885 for connection D-D1.

In embodiments where signal path 885 does not violate the timing requirements for connection D-D1, or only slightly violates the timing requirements, signal path 885 may be determined as a routed connection and the routing process completed. The resulting smaller timing slack for connection D-D1 may result in degraded performance (e.g., intermittent errors, inability to overclock) relative to the connection routing shown in FIG. 6. Further, the connection routing shown in FIG. 8 uses more routing resources to make the same connections, which can impact other routings. In embodiments where signal path 885 does violate timing requirements sufficiently, further routing including ripup and reroute of at least connections C-C2 and C-C3 would be required, and processing resources would be required to determine which connections to reroute and ripup as well as to perform the reroute and ripup. Thus, embodiments utilizing the methodology described herein have concrete efficiency and performance benefits over conventional approaches.

Testing performed using the process of FIG. 3 has shown that the process provides improved performance in comparison with other approaches to routing connections in PLDs. For example, Table 1 below provides test results measuring a performance achievement percentage (PAP) value for various configurations of PLD 100 (e.g., tests 1-7) for priority group routing, as described herein, as compared to conventional routing approaches. The PAP values may be determined in accordance with the following equation 1:

$$PAP = \text{minimum(achieved value/specified value, for all timing requirements)} * 100\% \quad \text{(equation 1)}$$

In Table 1 below, "WS" and "TNS" present the Worst Slack, and the Total Negative Slack for the final routed designs, respectively. "CPU" is the CPU run time measured in seconds.

TABLE 1

| Design | Priority Group Off | | | | Priority Group On | | | | Difference | |
|---|---|---|---|---|---|---|---|---|---|---|
| | PAP | WS | TNS | CPU | PAP | WS | TNS | CPU | PAP | CPU |
| test1 | 77.81 | −2.28 | −359.40 | 429.00 | 77.23 | −2.36 | −78.52 | 412.00 | −0.75% | −3.96% |
| test2 | 78.58 | −2.18 | −1569.42 | 2645.00 | 80.18 | −1.98 | −1497.13 | 1946.00 | 2.04% | −26.43% |
| test3 | 48.56 | −10.59 | −10271.34 | 3096.00 | 49.50 | −10.20 | −9300.57 | 2900.00 | 1.94% | −6.33% |
| test4 | 77.28 | −1.47 | −358.28 | 787.00 | 75.73 | −1.60 | −227.92 | 847.00 | −2.01% | 7.62% |
| test5 | 66.88 | −3.44 | −1683.76 | 3570.00 | 66.38 | −3.52 | −1682.43 | 2543.00 | −0.75% | −28.77% |
| test6 | 64.22 | −55.71 | −133750.93 | 760.00 | 64.88 | −54.12 | −135009.33 | 727.00 | 1.03% | −4.34% |
| test7 | 46.46 | −3.80 | −6482.75 | 305.00 | 45.25 | −3.99 | −6235.61 | 317.00 | −2.60% | 3.93% |
| Average | | | | | | | | | −0.16% | −8.32% |

As shown in Table 1, when priority group routing is used ("On"), the process of FIG. 3 provides significant improvements in performance and processing time for many design configurations for PLD 100.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

I claim:

1. A computer-implemented method comprising:
   determining timing slacks for connections described in a netlist for a programmable logic device (PLD);
   determining a plurality of priority groups, wherein the connections are associated with one or more of the priority groups based on the timing slacks; and
   routing the connections, for PLD configuration, associated with each priority group, from a highest priority group to a lowest priority group, wherein each priority group is iteratively routed to remove routing conflicts before lower priority groups are routed, the iterative routing of each priority group comprising updating the timing slacks corresponding to routed connections; and adjusting at least one of the plurality of priority groups based on the updated timing slacks.

2. The computer-implemented method of claim 1, wherein the iterative routing for at least one of the plurality of priority groups further comprises connection-based routing negotiation.

3. The computer-implemented method of claim 1, wherein the plurality of priority groups are determined by percentages applied to a range of the timing slacks.

4. The computer-implemented method of claim 1, wherein the plurality of priority groups are determined by percentages applied to a total number of the connections.

5. The computer-implemented method of claim 1, wherein the lowest priority group includes all the connections.

6. The computer-implemented method of claim 1, wherein the determining timing slacks comprises determining positions of source and load nodes for the connections.

7. The computer-implemented method of claim 1, wherein the determining timing slacks comprises estimating signal propagation times between source and load nodes for the connections.

8. A computer-implemented method comprising:
   determining timing slacks for connections described in a netlist for a programmable logic device (PLD);
   determining a plurality of priority groups, wherein the connections are associated with one or more of the priority groups based on the timing slacks; and
   routing the connections, for PLD configuration, associated with each priority group, from a highest priority group to a lowest priority group, wherein each priority group is iteratively routed to remove routing conflicts before lower priority groups are routed, wherein the iterative routing for at least one of the plurality of priority groups comprises signal-based routing negotiation comprises reusing a portion of a maze expansion wave for the connections that are associated with the at least one priority group and that are associated with a single signal.

9. A system comprising:
   a processor; and
   a memory adapted to store a plurality of computer readable instructions which when executed by the processor are adapted to cause the system to perform a computer-implemented method comprising:
   determining timing slacks for connections described in a netlist for a programmable logic device (PLD),
   determining a plurality of priority groups, wherein the connections are associated with one or more of the priority groups based on the timing slacks, and
   routing the connections associated with each priority group, from a highest priority group to a lowest priority group, wherein each priority group is iteratively routed to remove routing conflicts before lower priority groups are routed, wherein the iterative routing for each priority group comprises: updating the timing slacks corresponding to routed connections; and adjusting at least one of the plurality of priority groups based on the updated timing slacks.

10. The system of claim 9, wherein the iterative routing for at least one of the plurality of priority groups comprises connection-based routing negotiation.

11. The system of claim 9, wherein the plurality of priority groups are determined by percentages applied to a range of the timing slacks.

12. The system of claim 9, wherein the plurality of priority groups are determined by percentages applied to a total number of the connections.

13. The system of claim 9, wherein the lowest priority group includes all the connections.

14. The system of claim 9, wherein the determining timing slacks comprises determining positions of source and load nodes for the connections and/or estimating signal propagation times between source and load nodes for the connections.

15. A system comprising:
   a processor; and
   a memory adapted to store a plurality of computer readable instructions which when executed by the processor are adapted to cause the system to perform a computer-implemented method comprising:
   determining timing slacks for connections described in a netlist for a programmable logic device (PLD),
   determining a plurality of priority groups, wherein the connections are associated with one or more of the priority groups based on the timing slacks, and
   routing the connections associated with each priority group, from a highest priority group to a lowest priority group, wherein each priority group is iteratively routed to remove routing conflicts before lower priority groups are routed, wherein the iterative routing for at least one of the plurality of priority groups comprises signal-based routing negotiation comprising reusing a portion of a maze expansion wave for the connections that are associated with the at least one priority group and that are associated with a single signal.

16. A non-transitory machine-readable medium storing a plurality of machine-readable instructions which when executed by one or more processors of a computer system are adapted to cause the computer system to perform a computer-implemented method comprising:

determining timing slacks for connections described in a netlist for a programmable logic device (PLD);

determining a plurality of priority groups, wherein the connections are associated with one or more of the priority groups based on the timing slacks; and routing the connections associated with each priority group, from a highest priority group to a lowest priority group, wherein each priority group is iteratively routed to remove routing conflicts before lower priority groups are routed, wherein the iterative routing for each priority group comprises: updating the timing slacks corresponding to routed connections; and adjusting at least one of the plurality of priority groups based on the updated timing slacks.

\* \* \* \* \*